US008621458B2

(12) United States Patent
Traut et al.

(10) Patent No.: US 8,621,458 B2
(45) Date of Patent: Dec. 31, 2013

(54) SYSTEMS AND METHODS FOR EXPOSING PROCESSOR TOPOLOGY FOR VIRTUAL MACHINES

(75) Inventors: Eric P. Traut, Bellevue, WA (US); Rene Antonio Vega, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1902 days.

(21) Appl. No.: 11/018,337

(22) Filed: Dec. 21, 2004

(65) Prior Publication Data

US 2006/0136653 A1   Jun. 22, 2006

(51) Int. Cl.
*G06F 9/455* (2006.01)
*G06F 9/46* (2006.01)

(52) U.S. Cl.
USPC ............................... 718/1; 718/102; 718/104

(58) Field of Classification Search
USPC .......................................... 718/1, 104; 711/6
See application file for complete search history.

(56) References Cited

U.S. PATENT DOCUMENTS

| | | | |
|---|---|---|---|
| 5,692,193 A * | 11/1997 | Jagannathan et al. | 718/106 |
| 6,247,109 B1 | 6/2001 | Kleinsorge et al. | 712/13 |
| 7,290,259 B2 * | 10/2007 | Tanaka et al. | 718/1 |
| 7,430,737 B2 * | 9/2008 | Welbon et al. | 718/1 |
| 2002/0016812 A1 * | 2/2002 | Uchishiba et al. | 709/104 |
| 2003/0212884 A1 | 11/2003 | Lee et al. | 713/1 |
| 2004/0054996 A1 * | 3/2004 | Srinivas et al. | 718/1 |
| 2004/0107421 A1 * | 6/2004 | VoBa et al. | 718/102 |
| 2004/0111715 A1 | 6/2004 | Stone | |
| 2004/0226026 A1 * | 11/2004 | Glass et al. | 719/328 |
| 2005/0132363 A1 | 6/2005 | Tewari et al. | |
| 2005/0132365 A1 * | 6/2005 | Madukkarumukumana et al. | 718/1 |
| 2006/0090161 A1 | 4/2006 | Bodas et al. | |
| 2007/0233775 A1 | 10/2007 | Jackson et al. | |

FOREIGN PATENT DOCUMENTS

| | | |
|---|---|---|
| EP | 0917056 | 9/2008 |
| JP | 2000132530 | 5/2000 |
| JP | 2006-302270 | 11/2006 |

OTHER PUBLICATIONS

Zhou, Dual-Core Execution: Building a Highly Scalable Single-Thread Instruction Window, IEEE 14$^{th}$ Int. Conf. on Parallel Architectures and Compilation techniques, Sep. 2005, pp. 231-242.

* cited by examiner

*Primary Examiner* — Kenneth Tang
(74) *Attorney, Agent, or Firm* — Woodcock Washburn LLP

(57) ABSTRACT

The present invention is directed to making a guest operating system aware of the topology of the subset of host resources currently assigned to it. At virtual machine boot time a Static Resource Affinity Table (SRAT) will be used by the virtualizer to group guest physical memory and guest virtual processors into virtual nodes. Thereafter, in one embodiment, the host physical memory behind a virtual node can be changed by the virtualizer as necessary, and the virtualizer will provide physical processors appropriate for the virtual processors in that node.

17 Claims, 6 Drawing Sheets

SYSTEMS AND METHODS FOR EXPOSING PROCESSOR TOPOLOGY FOR VIRTUAL MACHINES

FIELD OF THE INVENTION

The present invention generally relates to the field of virtual machines (also known as "processor virtualization") and to operating systems that execute in virtual machine environments. More specifically, the present invention is directed to systems and methods for exposing the processor topology of a virtual machine to a guest operating system executing on a virtual machine wherein said topology is dynamic based on allocations of host computer system processor and memory resources.

BACKGROUND OF THE INVENTION

Computers include general purpose central processing units (CPUs) or "processors" that are designed to execute a specific set of system instructions. A group of processors that have similar architecture or design specifications may be considered to be members of the same processor family. Examples of current processor families include the Motorola 680x0 processor family, manufactured by Motorola, Inc. of Phoenix, Ariz.; the Intel 80x86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80x86 processor family is incompatible with the instruction set used by the PowerPC processor family. The Intel 80x86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80x86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

Virtual Machines

Computer manufacturers want to maximize their market share by having more rather than fewer applications run on the microprocessor family associated with the computer manufacturers' product line. To expand the number of operating systems and application programs that can run on a computer system, a field of technology has developed in which a given computer having one type of CPU, called a host, will include a virtualizer program that allows the host computer to emulate the instructions of an unrelated type of CPU, called a guest. Thus, the host computer will execute an application that will cause one or more host instructions to be called in response to a given guest instruction, and in this way the host computer can both run software designed for its own hardware architecture and software written for computers having an unrelated hardware architecture.

As a more specific example, a computer system manufactured by Apple Computer, for example, may run operating systems and program written for PC-based computer systems. It may also be possible to use virtualizer programs to execute concurrently on a single CPU multiple incompatible operating systems. In this latter arrangement, although each operating system is incompatible with the other, virtualizer programs can host each of the several operating systems and thereby allowing the otherwise incompatible operating systems to run concurrently on the same host computer system.

When a guest computer system is emulated on a host computer system, the guest computer system is said to be a "virtual machine" as the guest computer system only exists in the host computer system as a pure software representation of the operation of one specific hardware architecture. The terms virtualizer, emulator, direct-executor, virtual machine, and processor emulation are sometimes used interchangeably to denote the ability to mimic or emulate the hardware architecture of an entire computer system using one or several approaches known and appreciated by those of skill in the art. Moreover, all uses of the term "emulation" in any form is intended to convey this broad meaning and is not intended to distinguish between instruction execution concepts of emulation versus direct-execution of operating system instructions in the virtual machine. Thus, for example, the Virtual PC software created by Connectix Corporation of San Mateo, Calif. "emulates" (by instruction execution emulation and/or direct execution) an entire computer that includes an Intel 80x86 Pentium processor and various motherboard components and cards, and the operation of these components is "emulated" in the virtual machine that is being run on the host machine. A virtualizer program executing on the operating system software and hardware architecture of the host computer, such as a computer system having a PowerPC processor, mimics the operation of the entire guest computer system.

The virtualizer program acts as the interchange between the hardware architecture of the host machine and the instructions transmitted by the software (e.g., operating systems, applications, etc.) running within the emulated environment. This virtualizer program may be a host operating system (HOS), which is an operating system running directly on the physical computer hardware (and which may comprise a hypervisor, discussed in greater detailed later herein). Alternately, the emulated environment might also be a virtual machine monitor (VMM) which is a software layer that runs directly above the hardware, perhaps running side-by-side and working in conjunction with the host operating system, and which can virtualize all the resources of the host machine (as well as certain virtual resources) by exposing interfaces that are the same as the hardware the VMM is virtualizing. This virtualization enables the virtualizer (as well as the host computer system itself) to go unnoticed by operating system layers running above it.

To summarize, processor emulation enables a guest operating system to execute on a virtual machine created by a virtualizer running on a host computer system, said host computer system comprising both physical hardware and a host operating system.

Processor and Memory Topology

Modern operating system schedulers take into account the processor and memory topology of the machine to maximize performance. This is usually done at startup and, for an operating system executing on physical hardware, this is usually sufficient because the processor topology of physical hardware remains constant. The Windows Operating System (Windows XP, Windows 2003) and other operating systems typically determine the topology of the system at boot time in two ways: (a) by examining the memory and processor node topology information in the BIOS Static Resource Affinity Table (SRAT) and (b) by reading self-contained processor identification data (CPUID in x86/x64 processors) to determine specific Simultaneous Multithreading (SMT, a.k.a. hyperthreading) and multicore topologies.

As used herein, the term "processor topology" is broadly intended to refer to physical characteristics of the processor and associated memory that, if known by an operating system, could theoretically enable an operating system to better utilize the associated processor resources. Processor topology may include, but is not limited to, the following: static processor information such as SMT, multicore, and BIOS' SRAT data and/or information; static NUMA information such as processor, memory, and I/O resource arrangements; and any changes to the foregoing.

In a virtual machine environment, however, while the physical processor topology for the "hosting agent" (the host operating system, virtual machine monitor, and/or hypervisor) remains constant, the physical resources assigned to a virtualizer, and thus the virtual machine, may vary rapidly over time, making the topology assumptions made by the guest operating system running on the virtual machine inaccurate and hence inefficient.

While the dynamic nature of the topology can be mitigated by always using the same physical processor assignments for virtual processors or by limiting the assignments to a specific node, this would severely and negatively impact the virtualizer's ability to make optimal use of all host resources. Therefore, what is needed in the art is means for rectifying the inefficiency of a changing virtual topology without negatively impacting the virtualizers ability to make optimal use of all host resources.

SUMMARY OF THE INVENTION

Various embodiments of the present invention are directed to systems and methods for making a guest operating system aware of the topology of the subset of host resources currently assigned to it. For certain of these embodiments, at virtual machine boot time a Static Resource Affinity Table (SRAT) will be used by the virtualizer to group guest physical memory and guest virtual processors into virtual nodes. Thereafter the host physical memory behind a virtual node can be changed by the virtualizer as necessary, and the virtualizer will provide physical processors appropriate for the virtual processors in that node.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

The inventive subject matter is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
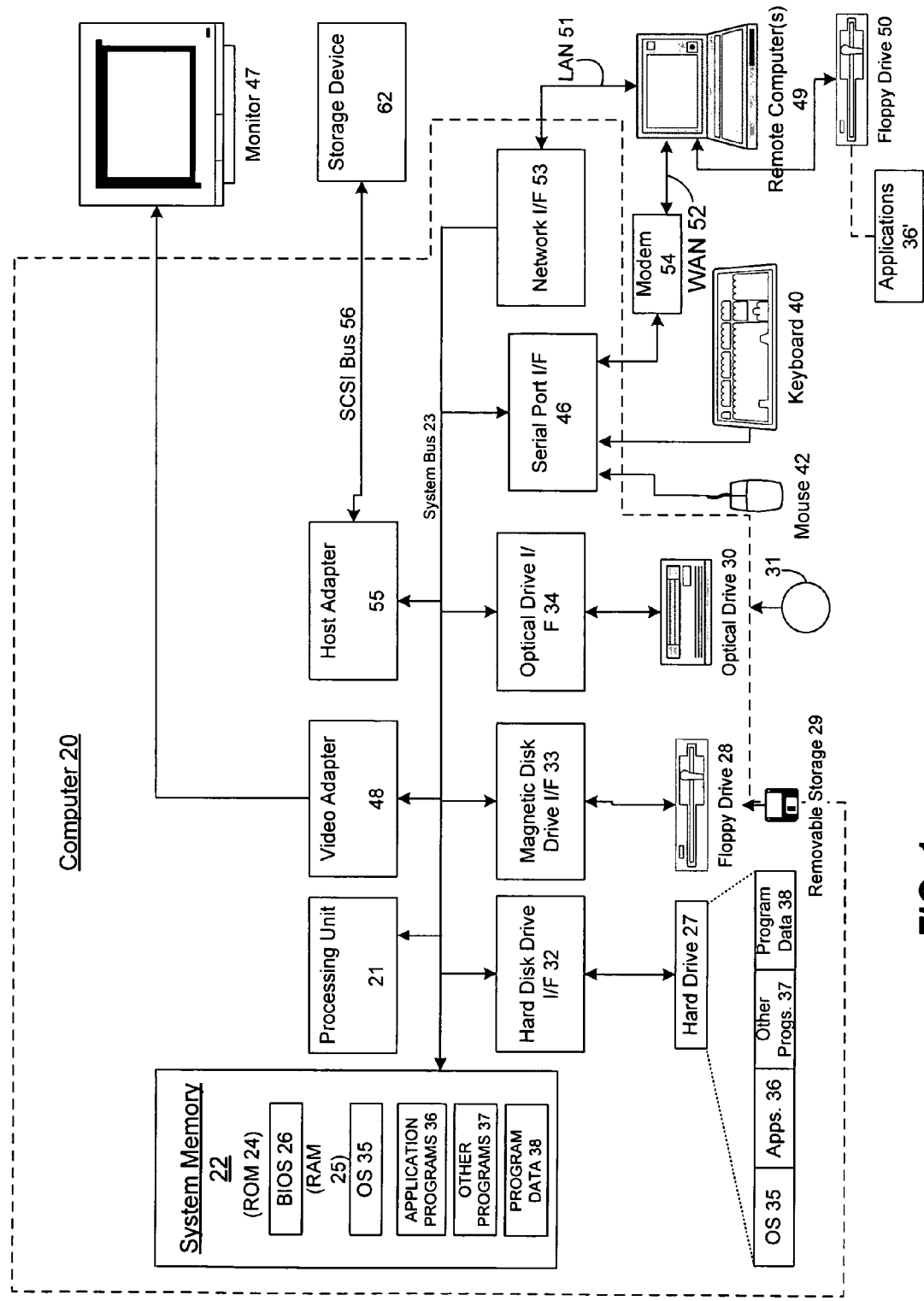
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present invention are particularly well-suited for computerized systems, nothing in this document is intended to limit the invention to such embodiments.

Virtual Machines

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that said software layers are running on their own private computer system, and thus VMs can allow multiple "guest systems" to run concurrently on a single "host system." This level of abstraction is represented by the illustration of FIG. 2.

Figure 2:
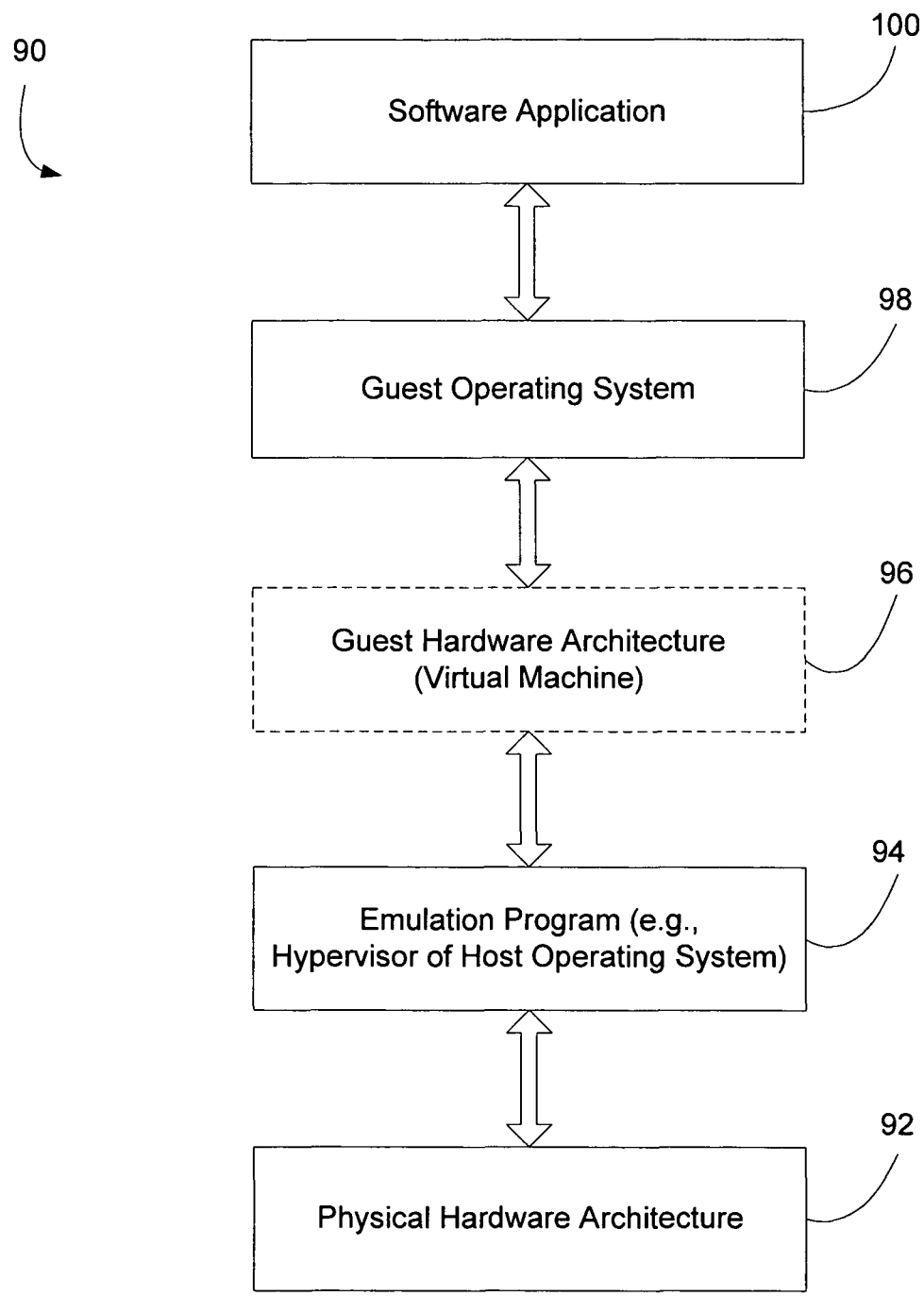
FIG. 2 is a block diagram representing the logical layering of the hardware and software architecture for an emulated operating environment in a computer system.

FIG. 2 is a diagram representing the logical layering of the hardware and software architecture for an emulated operating environment in a computer system. In the figure, an emulation program 94 runs directly or indirectly on the physical hardware architecture 92. Emulation program 94 may be (a) a virtual machine monitor that runs alongside a host operating system, (b) a specialized host operating system having native emulation capabilities, or (c) a host operating system with a hypervisor component wherein said hypervisor component performs said emulation. Emulation program 94 emulates a guest hardware architecture 96 (shown as broken lines to illustrate the fact that this component is the "virtual machine," that is, hardware that does not actually exist but is instead emulated by said emulation program 94). A guest operating system 98 executes on said guest hardware architecture 96, and software application 100 runs on the guest operating system 98. In the emulated operating environment of FIG. 2—and because of the operation of emulation program 94—software application 100 may run in computer system 90 even if software application 100 is designed to run on an operating system that is generally incompatible with the host operating system and hardware architecture 92.

Figure 3A:
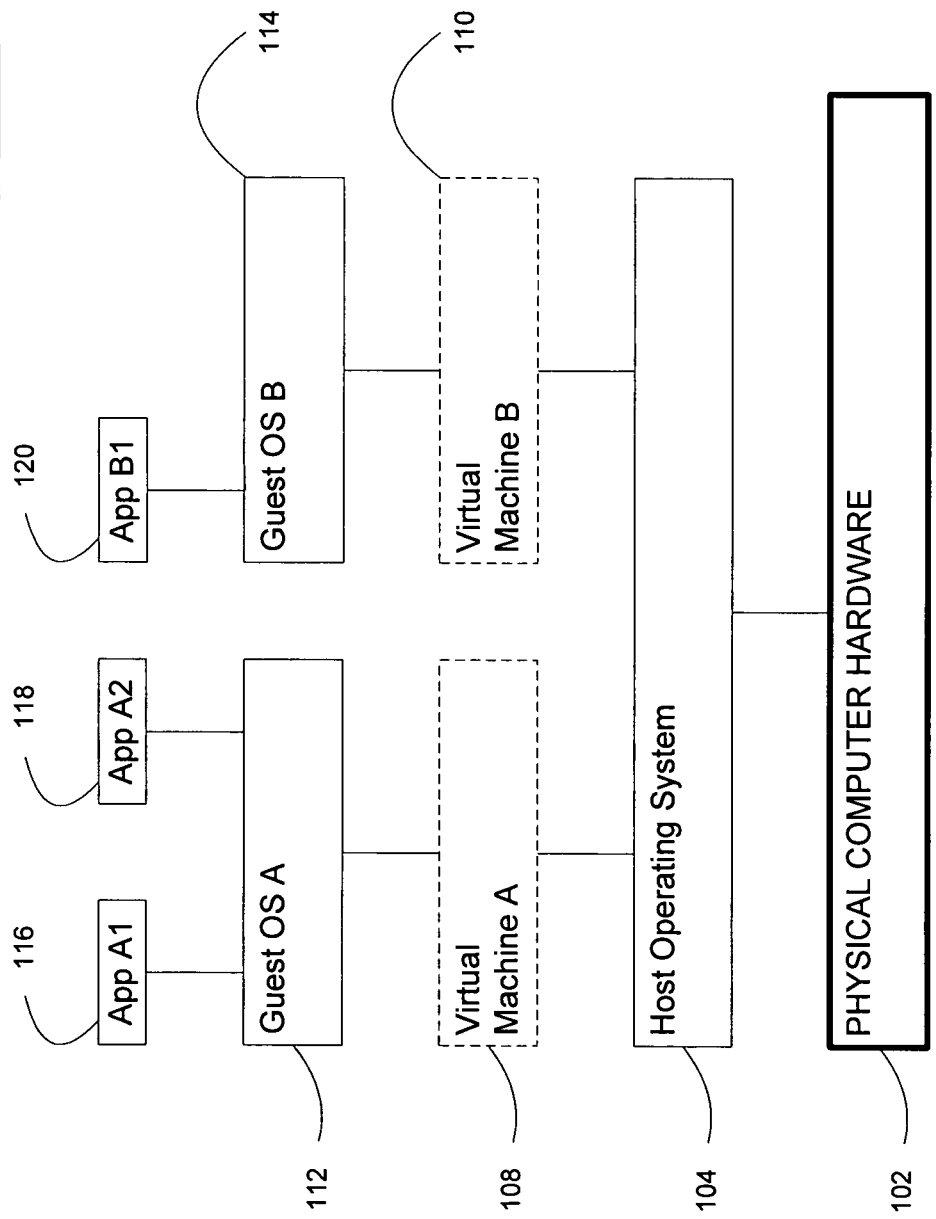
FIG. 3A is a block diagram representing a virtualized computing system wherein the emulation is performed by the host operating system (either directly or via a hypervisor)

FIG. 3A illustrates a virtualized computing system comprising a host operating system software layer 104 running directly above physical computer hardware 102 where the host operating system (host OS) 104 provides access to the resources of the physical computer hardware 102 by exposing interfaces that are the same as the hardware the host OS is emulating (or "virtualizing")—which, in turn, enables the host OS to go unnoticed by operating system layers running above it. Again, to perform the emulation the host operating system 102 may be a specially designed operating system with native emulations capabilities or, alternately, it may be a standard operating system with an incorporated hypervisor component for performing the emulation (not shown).

Referring again to FIG. 3A, above the host OS 104 are two virtual machine (VM) implementations, VM A 108, which may be, for example, a virtualized Intel 386 processor, and VM B 110, which may be, for example, a virtualized version of one of the Motorola 680x0 family of processors. Above each VM 108 and 110 are guest operating systems (guest OSs) A 112 and B 114 respectively. Running above guest OS A 112 are two applications, application A1 116 and application A2 118, and running above guest OS B 114 is application B1 120.

In regard to FIG. 3A, it is important to note that VM A 108 and VM B 110 (which are shown in broken lines) are virtualized computer hardware representations that exist only as software constructs and which are made possible due to the execution of specialized emulation software(s) that not only presents VM A 108 and VM B 110 to Guest OS A 112 and Guest OS B 114 respectively, but which also performs all of the software steps necessary for Guest OS A 112 and Guest OS B 114 to indirectly interact with the real physical computer hardware 102.

Figure 3B:
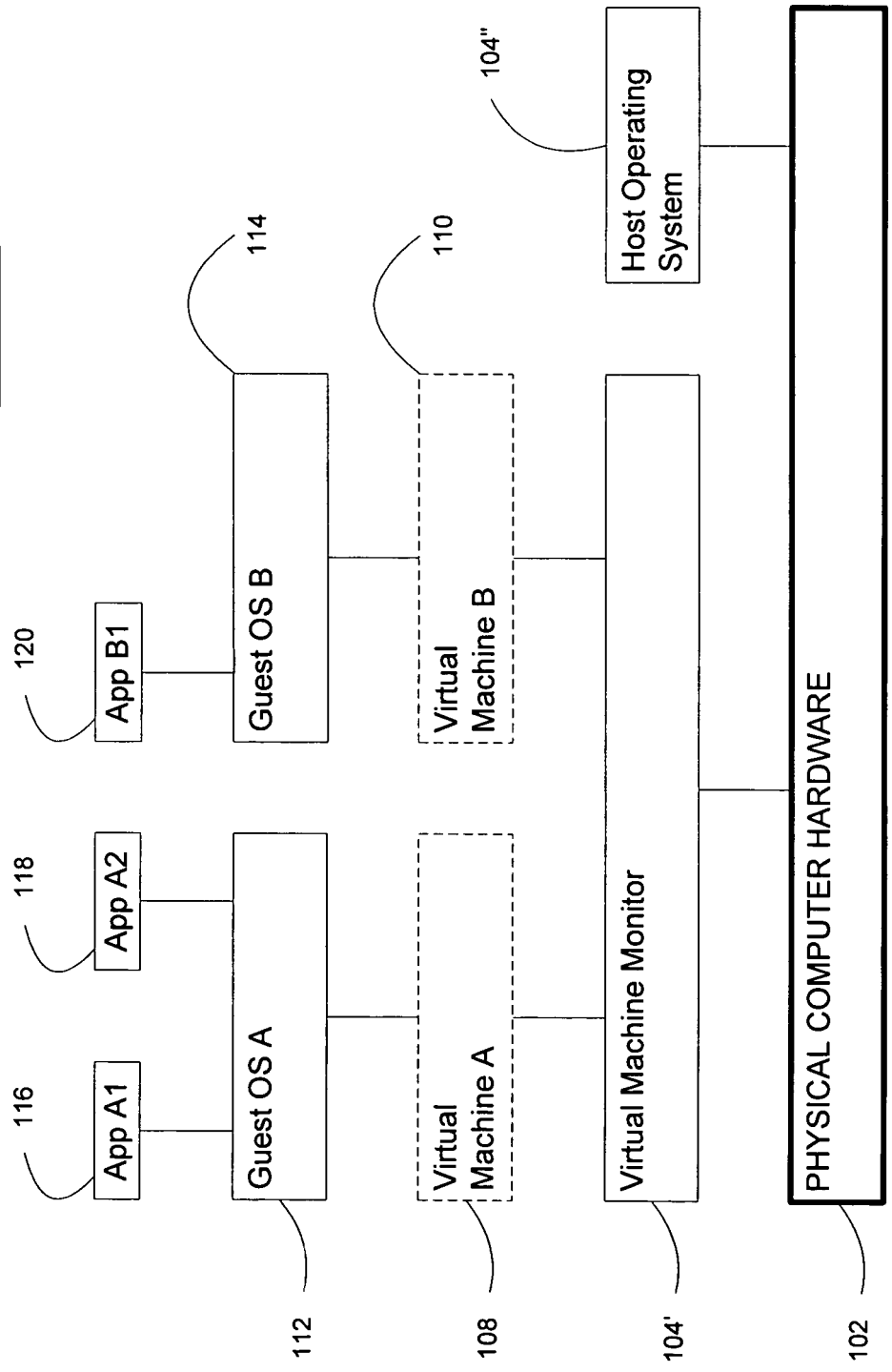
FIG. 3B is a block diagram representing an alternative virtualized computing system wherein the emulation is performed by a virtual machine monitor running side-by-side with a host operating system.

FIG. 3B illustrates an alternative virtualized computing system wherein the emulation is performed by a virtual machine monitor (VMM) 104' running alongside the host operating system 104". For certain embodiments the VMM may be an application running above the host operating system 104 and interacting with the computer hardware only through said host operating system 104. In other embodiments, and as shown in FIG. 3B, the VMM may instead comprise a partially independent software system that on some levels interacts indirectly with the computer hardware 102 via the host operating system 104 but on other levels the VMM interacts directly with the computer hardware 102 (similar to the way the host operating system interacts directly with the computer hardware). And in yet other embodiments, the VMM may comprise a fully independent software system that on all levels interacts directly with the computer hardware 102 (similar to the way the host operating system interacts directly with the computer hardware) without utilizing the host operating system 104 (although still interacting with said host operating system 104 insofar as coordinating use of said computer hardware 102 and avoiding conflicts and the like).

All of these variations for implementing the virtual machine are anticipated to form alternative embodiments of the present invention as described herein, and nothing herein should be interpreted as limiting the invention to any particular emulation embodiment. In addition, any reference to interaction between applications 116, 118, and 120 via VM A 108 and/or VM B 110 respectively (presumably in a hardware emulation scenario) should be interpreted to be in fact an interaction between the applications 116, 118, and 120 and the virtualizer that has created the virtualization. Likewise, any reference to interaction between applications VM A 108 and/or VM B 110 with the host operating system 104 and/or the computer hardware 102 (presumably to execute computer instructions directly or indirectly on the computer hardware 102) should be interpreted to be in fact an interaction between the virtualizer that has created the virtualization and the host operating system 104 and/or the computer hardware 102 as appropriate.

Processor Topology

In general, a "processor" is logic circuitry that responds to and processes the basic instructions that drive a computer, and is also the term that is often used as shorthand for the central processing unit (CPU). The processor in a personal computer or embedded in small devices is often called a microprocessor.

With regard to processor topology, and as used herein, the term "processor" specifically refers to a physical processor. A "physical processor" is an integrated circuit (IC)—sometimes called a "chip" or "microchip"—comprising a semiconductor wafer ("silicate") on which numerous tiny resistors, capacitors, and transistors form at least one processor core comprising at least one logical processor. Each processor core has the capability to execute system instructions, and each logical processor represents the hyperthreading capabilities (also known as symmetric multi-threading or "SMT") by which a single processor core seemingly executes two threads in parallel (and thus appears to be two cores to the system).

Each physical processor is fixed into a single socket on a CPU motherboard. A physical processor may have more than one processor core (each having one or more logical processors). Each processor core will typically have its own level-1 cache but share a level-2 cache with other processor cores on the physical processor.

A "multi-core processor" is a physical processor having two or more cores for enhanced performance, reduced power consumption, and/or more efficient simultaneous processing of multiple tasks (e.g., parallel processing). For example, a "dual-core processor"—which, as its name suggests, is a multi-core processor having two processor cores—is somewhat similar to having two separate processors installed in the same computer. However, these two cores reside on a single physical processor and are essentially plugged into the same socket, and thus the connection between these two processor cores is faster than it would be for two single-core processors plugged into separate sockets.

Because of these performance gains, multi-core processing is growing in popularity as single-core processors rapidly reach the physical limits of possible complexity and speed. Companies that have produced or are working on multi-core products include AMD, ARM, Broadcom, Intel, and VIA. Both AMD and Intel have announced that they will market dual-core processors by 2005.

Figure 4:
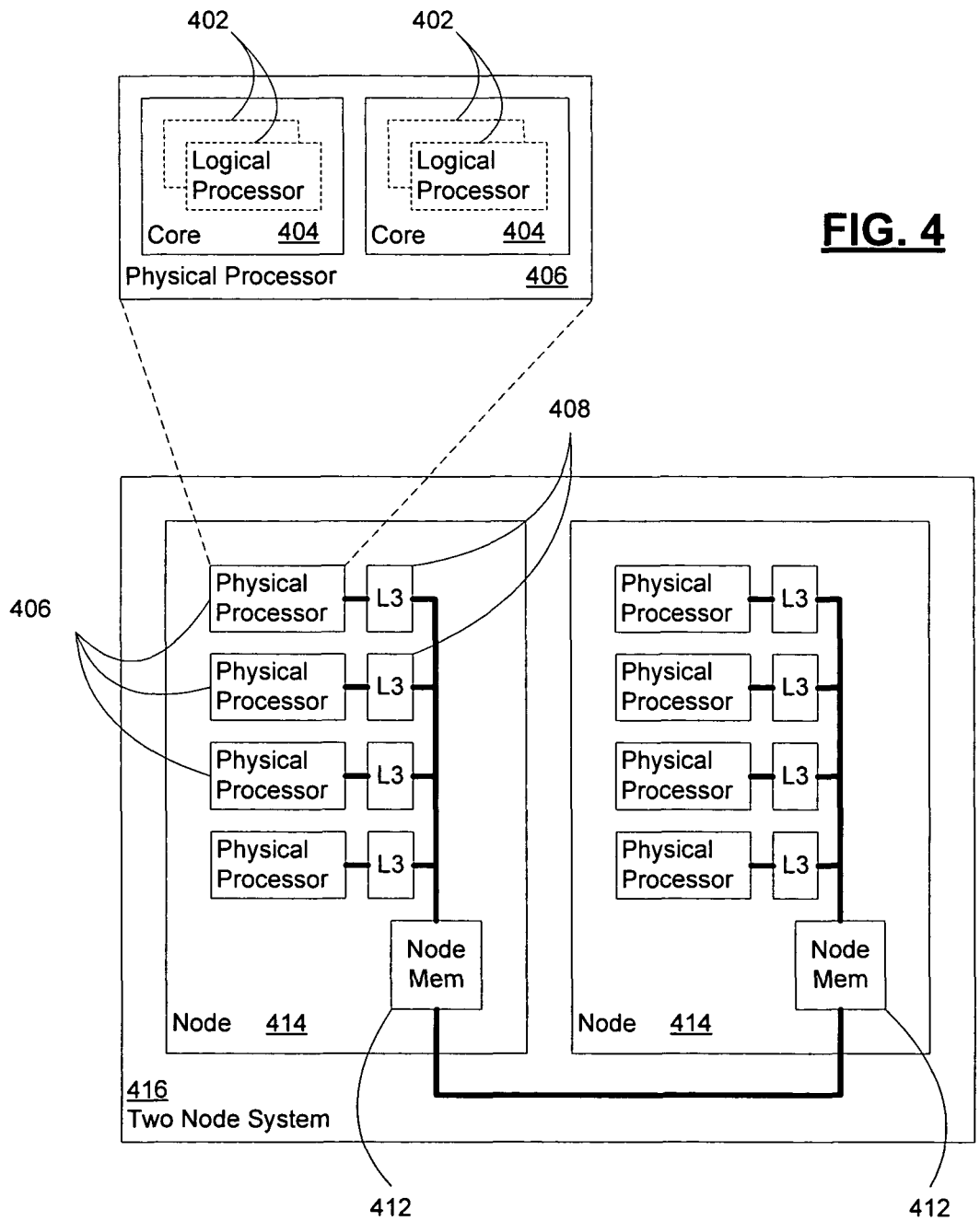
FIG. 4 is a block diagram illustrating a multi-core processor and a NUMA two-node system for which several embodiments of the present invention may be utilized.

FIG. 4 is a block diagram illustrating a multi-core processor and a NUMA two-node system for which several embodiments of the present invention may be utilized. In this figure, a physical processor 406 comprises two processor cores 404 which each in turn comprise two logical processors 402. The physical processor 406 is couple to memory 408, such as an L3-cache, that is shared and utilized by both cores 404 of the physical processor 406. This figure is further described below.

Memory Topology

NUMA (non-uniform memory access) is a method of configuring a node of physical processors in a multiprocessing system so that they can share memory locally, improving performance and the ability of the system to be expanded. NUMA is typically used in a symmetric multiprocessing (SMP) system that is a "tightly-coupled, share everything"

system in which multiple processors working under a single operating system access each other's memory over a common bus or "interconnect" path. Ordinarily, a limitation of SMP is that as microprocessors are added, the shared bus or data path gets overloaded and becomes a performance bottleneck; however, NUMA adds an intermediate level of memory (node memory) shared among that node's microprocessors so that all data accesses do not have to travel on the main bus.

Referring again to FIG. 4, the two node system 416 comprises two nodes 414, each having four physical processors 406, each physical processor 406 having its own L3 cache that is shared by the processor cores 404 of each said cache. In addition, each physical processor 406 and its associated L3 cache memory 408 is coupled to each other and to a shared node memory 412. The nodes 414 and their associated node memories 412 are also coupled together in this two-node system 416 as shown.

A NUMA node typically consists of four physical processors interconnected on a local bus to a shared memory (the "L3 cache") all on a single motherboard. This unit can be added to similar units to form a symmetric multiprocessing system in which a common SMP bus interconnects all of the nodes. Such a system typically contains from 16 to 256 microprocessors. To an application program running in an SMP system, all the individual processor memories look like a single memory.

When a processor core looks for data at a certain memory address, it first looks to its L1 cache, then on the L2 cache for the physical processor, and then to the L3 cache that the NUMA configuration provides before seeking the data in the "remote memory" located near the other microprocessors. Data is moved on the bus between the clusters of a NUMA SMP system using scalable coherent interface (SCI) technology. SCI coordinates what is called "cache coherence" or consistency across the nodes of the multiple clusters.

Exposing Processor Topology

Various embodiments of the present invention are directed to systems and methods for making a guest operating system aware of the topology of the subset of host resources currently assigned to it. For certain of these embodiments, at virtual machine boot time a Static Resource Affinity Table (SRAT) will be used by the virtualizer to group guest physical memory and guest virtual processors into virtual nodes. Thereafter the host physical memory behind a virtual node can be changed by the virtualizer as necessary, and the virtualizer will provide physical processors appropriate for the virtual processors in that node. This approach allows NUMA-aware operating systems executing on the virtual machine to schedule for optimal performance without further modification.

For certain alternative embodiments, the virtualizer may also provide dynamic processor topology information for the guest operating system in virtual machine memory. This information may be placed directly into the guest operating system's internal tables or, alternately, the guest operating system may execute additional code to pick this information from a shared memory location. The latter approach, referred to as "disclosing" (where the VM discloses information on a regular basis to the guest operation system, and the guest operating system regularly checks for updated info and adjusts accordingly) requires that the guest operating system be provided with additional code to cause it to periodically acquire this dynamic information.

Figure 5:
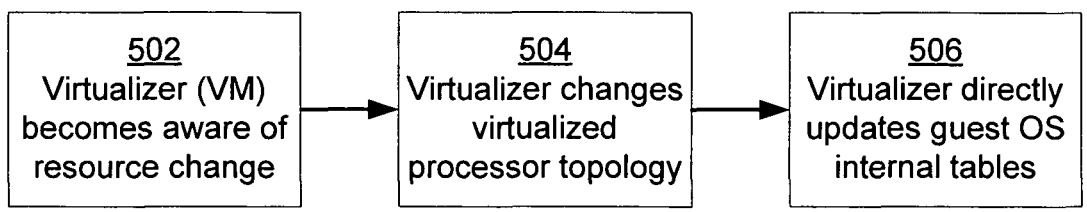
FIG. 5 is a process flow diagram illustrating one method by which a virtualizer provides dynamic processor topology information for the guest operating system in virtual machine memory for certain embodiments of the present invention.

FIG. 5 is a process flow diagram illustrating one method by which a virtualizer provides dynamic processor topology information for the guest operating system in virtual machine memory for certain embodiments of the present invention. In the figure, the virtualizer, at step 502, becomes aware that the physical hardware resources allocated to it has changed. At step 504, the virtualizer reconfigures the processor topology it is virtualizing. At step 506, the virtualizer updates the processor topology information for the guest operating system directly placing updated topology information directly into the guest operating system's internal tables.

For certain embodiments of the present invention, the guest operating system would execute a virtual machine call (a call to the virtualizer) which designates a virtual machine's physical memory page to be shared by both the virtualizer and the guest OS. This page may contain a control field with disclosure data to determine, for example: (a) whether the virtualizer should send an interrupt to the guest operating system whenever it changes the virtual machine topology to match changes in host computer system resource allocations to said virtual machine; (b) the vector to be used for the notification interrupt; (c) a generation counter which is incremented whenever the hypervisor updates the topology data; (d) a bit-mask of all virtual processors in the same SMT or hyper-threaded processor core; and/or (e) a bit-mask of all virtual processors in the same physical processor, that is, all logical processors in all cores in each physical processor. In addition, disclosure data may address any of the following aspects of efficiency: (a) thread priority; (b) I/O priority; (c) range of protected memory; (d) NUMA nodes; (e) data pertaining to near memory and far memory access; (f) processor speed and processor power consumption; (g) sockets and, for each core, hyperthreading; and/or (h) sharing level for each physical processor.

The scheduler of an operating system that has access to dynamic processor and NUMA topology information, such as when the "disclosing" approach is used, is able to use this information to optimize its own resource allocation mechanisms (e.g. processor scheduling, memory allocation, etc.) and resource utilization schemes. For certain additional embodiments of the present invention, the guest OS (either through virtualizer/virtual machine calls or through a shared memory page) may provide hints about resource allocation preferences to the virtualizer in a process called "hinting" (which is the logical converse of disclosing"). For example, if the guest OS would prefer to keep two virtual processors assigned to two cores on the same processor or two processors within the same NUMA node for efficiency, it could provide such a hint to the VM and the virtual machine scheduler could take this hint into account with regard to the virtualized processors as they pertain to the underlying physical processors assigned to said VM at any given time. More specifically, such hints may address any of the following aspects of efficiency: (a) thread priority; (b) I/O priority; and/or (c) latency information. Thus, for embodiments of the present invention, both the scheduler for the guest operation system as well as the scheduler for the VM—which independently manage resources—to utilize and employ "disclosing" and "hinting" to work cooperatively to maximize the efficiency of the entire system.

Figure 6:
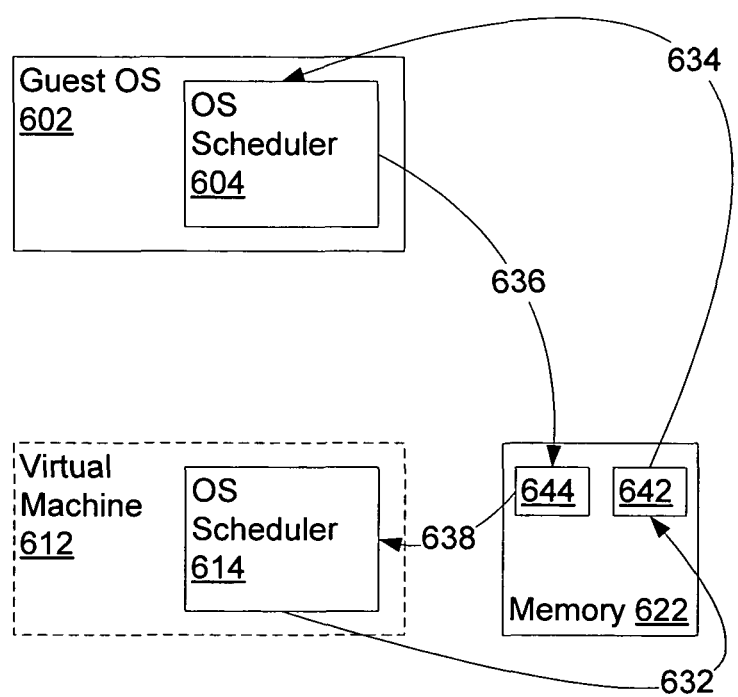
FIG. 6 is a block diagram that illustrates a two-tier disclosing and hinting approach for several embodiments of the present invention.

FIG. 6 is a block diagram that illustrates a two-tier disclosing and hinting approach for several embodiments of the present invention. In the figure, the guest operating system 602 comprises an OS scheduler 604 and the virtual machine 612 comprises a VM scheduler 614. The VM scheduler 614 schedules execution of virtual machine threads on the various logical processors of the physical hardware as such logical processors are made available to the virtual machine (and which are ever-changing) by, for example, the host operating system which schedules utilization of said physical hardware resources. A shared memory 622 that has been allocated to the virtual machine is utilized by both the guest OS scheduler 604 to provide "hinting" information to the VM scheduler 614, and this shared memory 622 is also utilized by the VM scheduler 614 to provide "disclosing" information to the guest OS scheduler 604. For example, along data flow 632, the VM scheduler 614 writes disclosing data 642 to the shard memory 622 and, along data flow 634, this data is read by the OS scheduler 604 and used to by the OS scheduler 604 to more efficiently use the current processor resources that are available (and which dynamically change from time to time). Conversely, along data flow 636, the OS scheduler 604 writes "hinting" data 644 to the shared memory 622 and, along data flow 638, this data is read by the VM scheduler 614 and used by the VM scheduler 614 to more efficiently assign (and/or request) current processor resources to said guest operation system.

CONCLUSION

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly. Likewise, the use of synthetic instructions for purposes other than processor virtualization are also anticipated by the disclosures made herein, and any such utilization of synthetic instructions in contexts other than processor virtualization should be most broadly read into the disclosures made herein.

What is claimed:

1. A method for optimizing performance of an operating system executing on a guest computer system comprising a virtual machine on a host computer system, the method comprising:
   continuously executing the operating system in the guest computer system, the guest computer system having a virtual processor topology;
   during the continuous execution of the operating system, determining a change to a resource allocated by the host computer system to the guest computer system, the change in the resource causing a change in the virtual processor topology; and
   thereafter, during the continuous execution of the operating system, updating the operating system with an update based on the change in the virtual processor topology, the operating system scheduling the use of virtual processor resources based on the change in the virtual processor topology during the execution of the operating system.

2. The method of claim 1, wherein updating the operating system is accomplished by a virtualizer associated with the virtual machine that directly updates the at least one internal table of the operating system.

3. The method of claim 1, wherein updating the operating system is accomplished by a virtualizer associated with the virtual machine updating a shared memory location with a disclosure, and the operating system subsequently accessing the shared memory location, retrieving the disclosure, and applying the disclosure.

4. The method of claim 3 wherein the guest operating system subsequently accessing the shared memory location is performed in accordance with a schedule or is performed in response to an interrupt generated by an emulator in the virtual machine.

5. The method of claim 3, wherein the operating system provides a hint to the virtualizer by updating a shared memory location with a hint, and the virtualizer subsequently accessing the shared memory location, retrieving the hint, and applying the hint.

6. The method of claim 1, implemented by a hardware control device, the hardware control device comprising means for implementing each element of the method.

7. A computer-readable storage medium comprising computer-readable instructions that upon execution by a computing device cause a virtualizer to:
   determine that a physical resource has changed during the execution of a guest operating system operating on the computing device; and
   update the guest operating system, the guest operating system operating on a guest computer system including a virtual machine having a virtual processor topology, after startup and during execution with an update to reflect a change in a virtual processor topology without the need to reboot the guest operating system.

8. The computer-readable medium of claim 7, further comprising instructions that, upon execution by the computing device, cause updating the operating system to be accomplished by the virtualizer associated with the virtual machine providing disclosure data directly to a internal table of the guest operating system.

9. The computer-readable medium of claim 7, further comprising instructions that, upon execution by the computing device, cause the updating to be accomplished by a virtualizer associated with the virtual machine updating a shared memory location with a disclosure, and the guest operating system subsequently accessing the shared memory location, retrieving the disclosure, and applying the disclosure.

10. The computer-readable medium of claim 9, further comprising instructions that, upon execution by the computing device, cause the guest operating system to access the shared memory location in accordance with a schedule or in response to an interrupt generated by an emulator in the virtual machine.

11. The computer-readable medium of claim 9, further comprising instructions that, upon execution by the computing device, cause the guest operating system to provide a hint to the virtualizer by updating a shared memory location with a hint, and the virtualizer subsequently accessing the shared memory location, retrieving the hint, and applying the hint.

12. A system for optimizing performance of guest operating system executing on a computer system, the computer system comprising:
   a computing device comprising a processor; and
   a memory in communication with the computing device when the system is operational, the memory having stored thereon computer readable instructions that when executed by the processor in the computing device cause:
      a virtualizer to determine that a system resource has changed during the operation of the guest operating system; and
      based on the change, cause a change to a virtual processor topology, by updating a guest operating system after startup and during execution of the guest operating system with an update to reflect a change in the virtual processor topology without stopping the execution of the guest operating system to update the operating system.

13. The system of claim 12, wherein the virtual processor topology change is based on changes to a set of resources dynamically allocated by a host computer system.

14. The system of claim 13, further comprising wherein the virtualizer provides disclosure data directly to an internal table of the guest operating system.

15. The system of claim 13, further comprising wherein the virtualizer provides disclosure data to a shared memory location, and the guest operating system subsequently accesses the shared memory location, retrieves the disclosure, and applies the disclosure.

16. The system of claim 15, further comprising instructions that when executed cause the operating system to subsequently access the shared memory location in accordance with a schedule or in response to an interrupt generated by an emulator in the virtual machine.

17. The system of claim 15, further comprising instructions that when executed cause the guest operating system to provide a hint to the virtualizer by updating the shared memory location with the hint, and the virtualizer subsequently accessing the shared memory location, retrieving the hint, and applying the hint.

* * * * *